US006954014B2

(12) United States Patent
Ohiwa et al.

(10) Patent No.: US 6,954,014 B2
(45) Date of Patent: Oct. 11, 2005

(54) MOTOR WITH FREQUENCY GENERATOR AND OFFICE AUTOMATION EQUIPMENT USING SAME

(75) Inventors: Shoji Ohiwa, Kiryu (JP); Yuji Enomoto, Hitachi (JP); Tomoyoshi Maruyama, Kiryu (JP); Yuji Takagai, Kiryu (JP); Sachio Hatori, Kiryu (JP); Kazuto Nagai, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/844,449

(22) Filed: May 13, 2004

(65) Prior Publication Data

US 2005/0001497 A1 Jan. 6, 2005

(30) Foreign Application Priority Data

May 15, 2003 (JP) ....................................... 2003-137806

(51) Int. Cl.[7] .......................... H02K 29/14; G01D 5/12; G05B 11/00

(52) U.S. Cl. ................ 310/68 B; 310/155; 310/156.36; 310/268; 310/DIG. 6; 324/174

(58) Field of Search ............................... 310/68 B, 155, 310/68 R, 180, 111, 156.36–156.38, DIG. 6, 156.43, 67 R, 268, 160–161, 168, 177, 207–208, 71, 113; 324/174; 318/151–154; 322/58

(56) References Cited

U.S. PATENT DOCUMENTS

| | | | | | |
|---|---|---|---|---|---|
| 4,701,650 | A | * | 10/1987 | Maemine | 310/68 R |
| 4,782,259 | A | * | 11/1988 | Shikama et al. | 310/156.47 |
| 5,089,733 | A | * | 2/1992 | Fukuoka | 310/67 R |
| 5,252,876 | A | * | 10/1993 | Kawai et al. | 310/184 |
| 5,260,619 | A | * | 11/1993 | Hara | 310/160 |
| 5,410,201 | A | * | 4/1995 | Tanaka et al. | 310/68 B |
| 5,717,268 | A | * | 2/1998 | Carrier et al. | 310/156.06 |
| 5,841,208 | A | * | 11/1998 | Abe | 310/67 R |
| 6,020,663 | A | * | 2/2000 | Furuki | 310/68 B |

FOREIGN PATENT DOCUMENTS

| | | | | |
|---|---|---|---|---|
| JP | 52-051512 | | 4/1977 | H02K/23/66 |
| JP | 59-220060 | * | 12/1984 | H02K/29/00 |
| JP | 60-70956 | * | 4/1985 | H02K/29/00 |
| JP | 62-110468 A | | 5/1987 | H02K/29/00 |
| JP | 63-257443 | * | 10/1988 | H02K/21/06 |
| JP | 3-284150 | * | 12/1991 | H02K/29/00 |
| JP | 04033552 A | * | 2/1992 | H02K/21/24 |
| JP | 11041897 A | * | 2/1999 | H02K/29/14 |
| JP | 2002330575 | * | 11/2002 | H02K/29/14 |

* cited by examiner

*Primary Examiner*—Burton Mullins
(74) *Attorney, Agent, or Firm*—Birch, Stewart, Kolasch & Birch, LLP

(57) ABSTRACT

The invention relates to a motor with a frequency generator attached thereto, equipped with the frequency generator (FG) for detecting a rotational speed of the motor. The motor with the frequency generator attached thereto comprises a magnet having 10 poles of main magnetic poles for driving the motor, and frequency generator magnetic poles, provided on an end face of the magnet, in the direction of a motor axle, a stator yoke disposed opposite to the inner circumference of the magnet with a gap interposed therebetween, and a printed wiring board disposed so as to oppose the end face of the magnet with a gap interposed therebetween, wherein a first coil pattern and a second coil pattern, in rectangular waveform, having a plurality of power generation wire-elements radially formed, respectively, are disposed a surface of the printed wiring board, opposite to the end face of the magnet, a rotational speed adopted is in a range of 300 to 500 r/min, an inside diameter of the magnet is in a size range of 40 to 65 mm, the number of magnetic poles of the frequency generator magnetic poles is in a range of 54 to 157, corresponding to integer multiples of the number of the magnetic poles of the main magnetic poles, and the number of the power generation wire-elements of the first coil pattern and the second coil pattern, respectively, is equal to the number of the magnetic poles of the frequency generator magnetic poles, and the main magnetic poles are aligned with the frequency generator magnetic poles, respectively.

8 Claims, 5 Drawing Sheets

MOTOR WITH FREQUENCY GENERATOR AND OFFICE AUTOMATION EQUIPMENT USING SAME

This Nonprovisional application claims priority under 35 U.S.C. § 119(a) on Patent Application No(s). 2003-137806 filed in JAPAN on May 15, 2003, the entire contents of which are hereby incorporated by reference.

BACKGROUND OF THE INVENTION

1. Field of the Invention

The invention relates to a motor with a frequency generator attached thereto, equipped with the frequency generator (FG) for detecting a rotational speed of the motor, that is, a motor with a frequency generator for driving drums, used in office automation (OA) equipment such as, for example, a laser beam printer (LBP), and OA equipment using the same.

2. Description of the Related Art

A conventional motor with a frequency generator attached thereto comprises a magnet in a ring-like shape, having 10 poles of main magnetic poles for driving the motor, provided at equal pitches in the radial direction, and a plurality of frequency generator magnetic poles, provided at equal pitches on an end face of the magnet, in the direction of a motor axle, and rotating integrally with the motor axle, a stator core having 12 salient poles of main magnetic poles, disposed opposite to the inner circumference of the magnet with a gap interposed therebetween and a printed wiring board disposed so as to oppose the end face of the magnet with a gap interposed therebetween, and provided with coil patterns of the frequency generator, formed thereon.

With the motor with the frequency generator attached thereto, having a configuration as described above, the frequency generator magnetic poles, provided at the end face of the magnet, cut across power generation wire-elements of the coil patterns, thereby generating a frequency generator signal.

However, because the magnet has radial anisotropy, a magnetic force emanating from the end face thereof, in the direction of the motor axle, is weak. Accordingly, if a rotational speed of the motor is low, an output voltage of the frequency generator drops, causing a problem that the output voltage cannot be recognized as the frequency generator signal. Further, main magnetic pole components of the magnetic force are superimposed on the output voltage of the frequency generator to thereby cause distortion to a waveform of the frequency generator signal as generated, so that the frequency generator signal deteriorates in accuracy, adversely affecting variation in rotational speed, and so forth.

Further, if a method is adopted whereby a magnet having thrust anisotropy is fixedly attached to the end face of the magnet having radial anisotropy in order to overcome the problem described, this will cause reduction in the main magnetic pole components of the magnetic force, resulting in improvement of an S/N ratio of the frequency generator. However, this will cause a problem of an increase in cost due to an increase in the number of components.

SUMMARY OF THE INVENTION

It is therefore an object of the invention to provide a motor with a frequency generator attached thereto, capable of extracting an output voltage of a frequency generator signal, in a large amount, without addition of a magnet having thrust anisotropy, eliminating adverse effects of main magnetic pole components of magnetic force emanating from a magnet, on power generation wire-elements of coils of the frequency generator, and improving an S/N ratio of the output voltage of the frequency generator.

Another object of the invention is to provide a motor with a frequency generator attached thereto, capable of eliminating adverse effects of main magnetic pole components of magnetic force emanating from a magnet., on power generation wire-elements of coils of the frequency generator, and improving an S/N ratio of an output voltage of the frequency generator.

According to one aspect of the present invention, there is provided a motor with a frequency generator attached thereto, comprising:

a magnet in a ring-like shape, having 10 poles of main magnetic poles for driving the motor, provided at equal pitches in the radial direction, and a plurality of frequency generator magnetic poles, provided at equal pitches on an end face of the magnet, in the direction of a motor axle, said magnet rotating integrally with the motor axle;

a stator yoke having 12 salient poles as main magnetic poles, disposed opposite to the inner circumference of the magnet with a gap interposed therebetween; and a printed wiring board disposed so as to oppose the end face of the magnet with a gap interposed therebetween, wherein a first coil pattern and a second coil pattern, in rectangular waveform, having a plurality of power generation wire-elements radially formed, respectively, are disposed a surface of the printed wiring board, opposite to the end face of the magnet, the first coil pattern and the second coil pattern being connected with each other in series, a rotational speed adopted is in a range of 300 to 500 r/min, an inside diameter of the magnet is in a size range of 40 to 65 mm, the number of magnetic poles of the frequency generator magnetic poles is in a range of 54 to 157, corresponding to odd multiples of the number of the magnetic poles of the main magnetic poles, and the number of the power generation wire-elements of the first coil pattern and the second coil pattern, respectively, is equal to the number of the magnetic poles of the frequency generator magnetic poles, the magnetic poles of the frequency generator magnetic poles, located at both ends of one magnetic pole of the main magnetic poles, respectively, have the same polarity as that of said one magnetic pole of the main magnetic poles, and the main magnetic poles are aligned with the frequency generator magnetic poles, respectively.

With the motor with the frequency generator attached thereto, described above, since the main magnetic poles and the frequency generator magnetic poles are caused to contribute to a generated voltage of the frequency generator, an output voltage of the frequency generator can be extracted in a large amount. In addition, the output voltage of the frequency generator does not contain disturbance caused by main magnetic pole components thereof, thereby enabling the motor to suppress variation in rotational speed.

Further, according to another aspect of the present invention, there is provided a motor with a frequency generator attached thereto, said motor comprising:

a magnet in a ring-like shape, having 10 poles of main magnetic poles for driving the motor, provided at equal pitches in the radial direction, and a plurality of frequency generator magnetic poles, provided at equal pitches on an end face of the magnet, in the direction of a motor axle, said magnet rotating integrally with the motor axle;

a stator yoke having 12 salient poles as main magnetic poles, disposed opposite to the inner circumference of the magnet with a gap interposed therebetween; and a printed wiring board disposed so as to oppose the end face of the magnet with a gap interposed therebetween, wherein a first coil pattern and a second coil pattern, in rectangular waveform, having a plurality of power generation wire-elements radially formed, respectively, are disposed a surface of the printed wiring board, opposite to the end face of the magnet, the first coil pattern and the second coil pattern being connected with each other in series, a rotational speed adopted is in a range of 300 to 500 r/min, an inside diameter of the magnet is in a size range of 40 to 65 mm, the number of magnetic poles of the frequency generator magnetic poles is in a range of 54 to 157, corresponding to even multiples of the number of the magnetic poles of the main magnetic poles, and the number of the power generation wire-elements of the first coil pattern and the second coil pattern, respectively, is equal to the number of the magnetic poles of the frequency generator magnetic poles, and the main magnetic poles are aligned with the frequency generator magnetic poles, respectively.

With the above-described motor with the frequency generator attached thereto, an output voltage of the frequency generator does not contain disturbance caused by main magnetic pole components thereof, thereby enabling the motor to suppress variation in rotational speed.

DETAILED DESCRIPTION OF THE PREFERRED EMBODIMENTS

Figure 1:
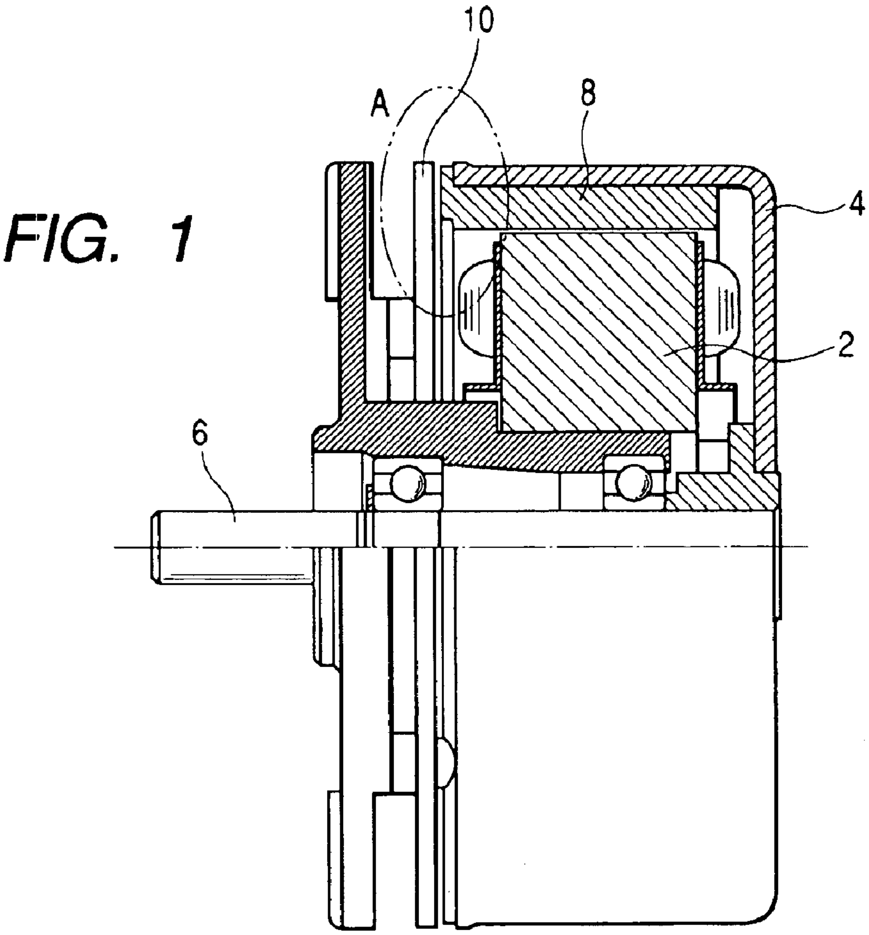
FIG. 1 is a sectional view showing a half of an embodiment of a motor with a frequency generator attached thereto, according to the invention.
Figure 2:
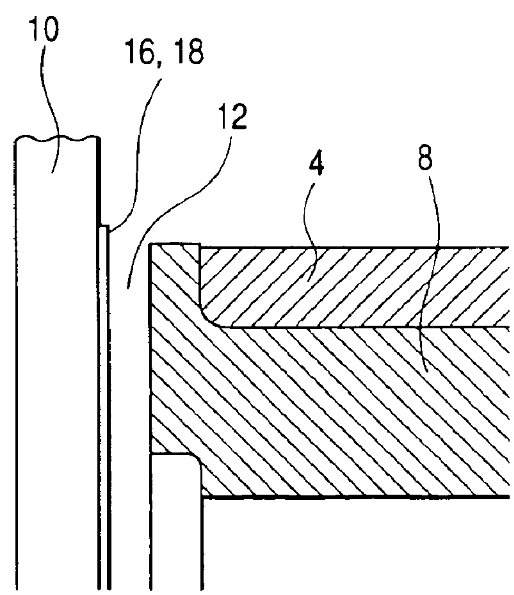
FIG. 2 is an enlarged sectional illustration showing a part A in FIG. 1.
Figure 3:
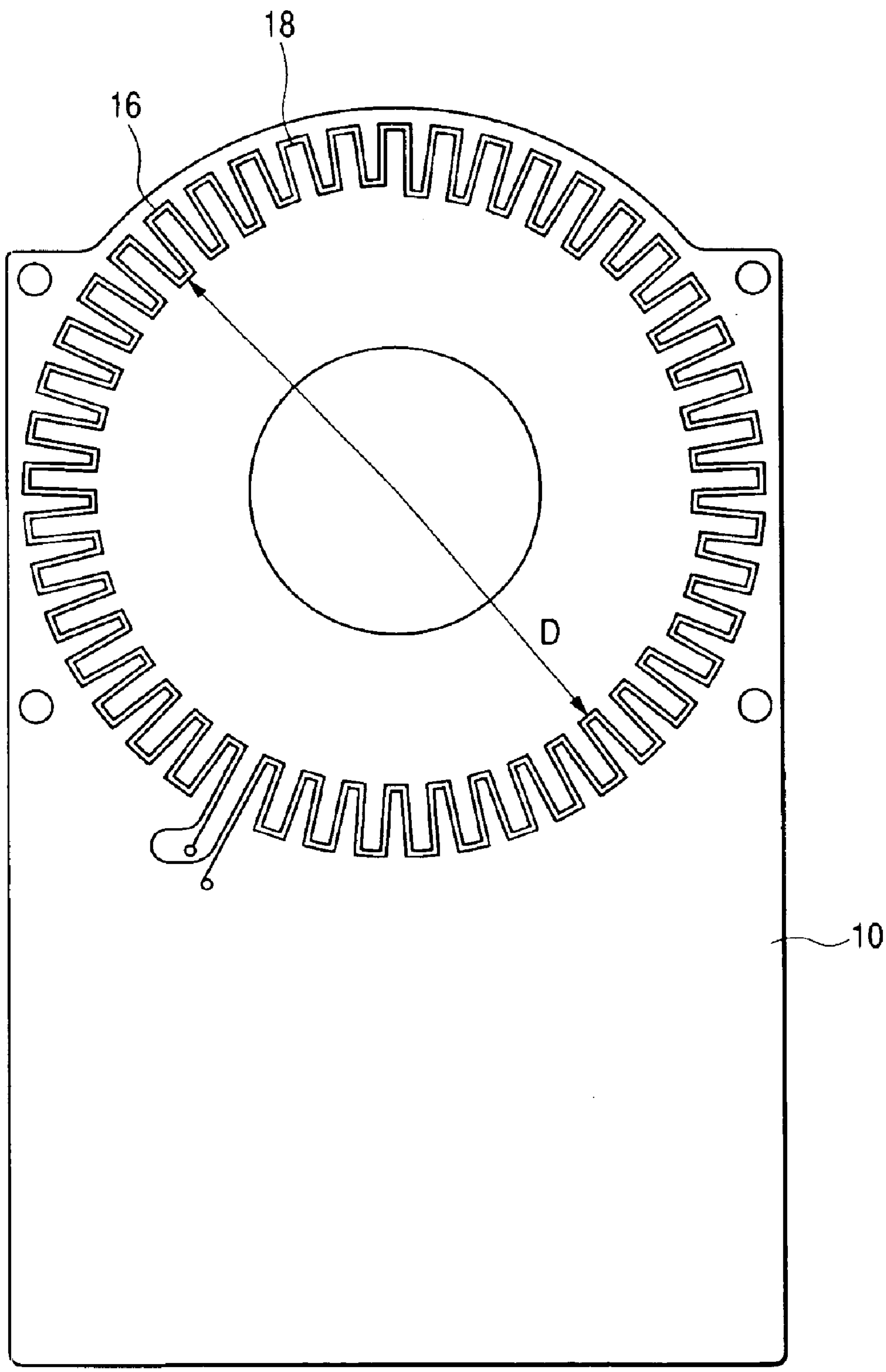
FIG. 3 is a schematic plan view showing a printed wiring board of the motor with the frequency generator attached thereto, shown in FIG. 1.

An embodiment of a motor with a frequency generator attached thereto, according to the invention, is broadly described hereinafter with reference to FIGS. 1 to 3. A stator yoke 2 has 12 salient poles as main magnetic poles. A rotor yoke 4 in a cup-like shape is fixedly attached to a motor axle 6, a magnet 8 in a ring-like shape, having radial anisotropy, is fixedly attached to the inner circumference of the rotor yoke 4, the magnet 8 is opposed to the stator yoke 2, 10 poles of main magnetic poles for driving the motor are magnetized on the magnet 8, at equal pitches in the radial direction, and frequency generator magnetic poles are magnetized at equal pitches on an end face of the magnet 8, in the direction of the motor axle 6. The magnet 8 is rotated integrally with the motor axle 6. The stator yoke 2 is provided with a printed wiring board with a drive circuit for the motor, mounted thereon, for example, a printed wiring board 10 using a paper phenol substrate with a copper foil 35 μm thick. On the printed wiring board 10, there are provided coil patterns 16, 18 for frequency power generation, formed by connecting a plurality of power generation wire-elements, radially extending and centering around the motor axle, with each other in a wave-like form in such a way as to oppose the end face of the magnet 8 through the intermediary of a gap 12, and the coil patterns 16, 18 are connected in series with each other, the frequency generator magnetic poles of the magnet 8, and the coil patterns 16, 18 constituting the frequency generator.

Figure 4:
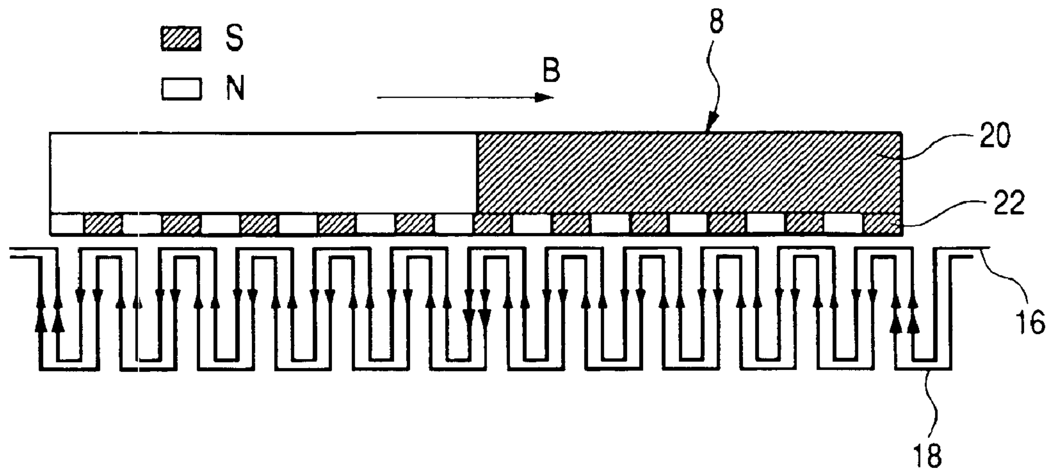
FIG. 4 is a schematic illustration showing a relationship among main magnetic poles, frequency generator magnetic poles, and coil patterns for frequency power generation with reference to the motor with the frequency generator attached thereto, shown in FIG. 1.

With reference to FIG. 4, there is described a relationship among the main magnetic poles, the frequency generator magnetic poles, and the coil patterns for frequency power generation. The frequency generator magnetic poles 22 are disposed such that the polarities thereof at respective ends of one magnetic pole of the main magnetic poles 20 of the magnet 8 are the same as that for the magnetic pole, the respective main magnetic poles 20 are aligned with the frequency generator magnetic poles 22, and the coil patterns 16, 18 are disposed so as to correspond to the frequency generator magnetic poles 22, respectively. More specifically, the number of the magnetic poles of the main magnetic poles 20 is 10 poles while the number of the magnetic poles of the frequency generator magnetic poles 22 is 110 poles, corresponding to odd multiples of the number of the magnetic poles of the main magnetic poles 20, and the number of the power generation wire-elements of the coil patterns 16, 18, respectively, is 110, equivalent to the number of the magnetic poles of the frequency generator magnetic poles 22.

Thus, with the above-described motor with the frequency generator attached thereto, as a result of the frequency generator magnetic poles 22 of the magnet 8 crossing the respective power generation wire-elements of the coil patterns 16, 18, a frequency generator signal corresponding to a rotational speed is generated by the coil patterns 16, 18, and the motor can be controlled to maintain a predetermined rotational speed by the frequency generator signal as generated.

In this case, since a half of the least common multiple of the number of the magnetic poles of the main magnetic poles 20, which is 10, and the number of the power generation wire-elements, which is 110, is 55, assuming that the main magnetic poles 20 generate an output voltage e2 of 55 cycles during one revolution of the motor, the frequency generator magnetic poles 22 generate an output voltage e1 of 55 cycles corresponding to a half of the least common multiple of the number of the magnetic poles of the frequency generator magnetic poles 22, 110 and the number of the power generation wire-elements, 110 and an out-of-phase amount between the main magnetic poles 20 and the frequency generator magnetic poles 22 is assumed to be α, the output voltages e1, and e2 are represented by the following expressions.

$$e1 = v1 \cdot \sin(55\theta)$$

$$e2 = v2 \cdot \sin(55\theta + 55\alpha)$$

Further, since an output voltage e of the frequency generator is the sum of the output voltages, e1 and e2, assuming that the out-of-phase amount $\alpha$ is turned to 0 by executing alignment of the main magnetic poles 20 with the frequency generator magnetic poles 22, the output voltage e of the frequency generator can be represented by the following expression.

$$e=e1+e2=(v1+v2)\cdot\sin(55\theta)$$

Accordingly, the output voltage e of the frequency generator does not contain frequency components causing higher harmonic disturbance, and the output voltage e of the frequency generator can be extracted in a large amount.

In FIG. 4, the orientations of arrows in the coil patterns 16, 18, respectively, indicate the respective orientations of generated voltages, and a smaller arrow indicates a voltage generated by the frequency generator magnetic poles 22 while a larger arrow indicates a voltage generated by the main magnetic poles 20. Further, an arrow B indicates the direction of movement of the magnet 8. It is evident from FIG. 4 that the direction of power generation by the frequency generator magnetic poles 22 coincides with that of power generation by the main magnetic poles 20, so that the respective voltages are added up.

Further, with a tandem color laser beam printer, and so forth, for which the motor according to the invention is used, four drums are disposed in parallel to be driven, and consequently, an outside diameter of the motor for use in driving the drums is preferably less in dimension than an diameter of the drum in order to achieve reduction in the space for the main body of the laser beam printer, so that the outside diameter of the motor is required to fall in a range of 40 to 60 mm. Still further, image quality is the most important characteristic for the laser beam printer, and variation in rotational speed, affecting the image quality, is considered important. Load torque for driving the drums of the laser beam printer is in a range of 0.5 to 1.0 N·m, and in order to make use of the motor with high efficiency, a rotational speed of the motor, in the order of 2000 r/min, is adopted to be decelerated to about 1/20 to 1/40 with a reduction gear. However, the reduction gear has factors causing deterioration in variation in rotational speed such as backlash, and deterioration in respect of gear tooth accuracy, outside diameter, and so forth, so that technological development toward lowering a speed reducing ratio of the reduction gear is under way. As a result, a method of decelerating with the reduction gear in one stage to reduce a rotational speed N to 300 to 500 r/min is under study.

Furthermore, with motor speed control characteristics required of the laser beam printer, there is a problem of waste time (phase lag) of the frequency generator, associated with variation in rotational speed and load response. The waste time of the frequency generator present itself as time lag in sampling over a control system, and assuming that a frequency of a frequency generator is fg, a phase lag amount $\Psi$ at frequency f can be represented by expression (1).

$$\varphi=-180\frac{f}{fg} \tag{1}$$

Further, in such an application as described, a response frequency fc of a speed control system by a phase-locked loop (PLL) is often set to a range of 10 to 20 Hz because of the rotational speed and characteristics of variation in rotational speed. As a guide for phase allowance and gain allowance in order to keep the speed control system stabilized, the frequency fg of the frequency generator is generally set as follows.

$$Fg>15\times fc$$

Accordingly, on the assumption that fc=20 Hz, and fg=400 Hz, the phase lag amount at frequency f=fc is calculated at 9 degrees. In the case of carrying out driving of the drums of the laser beam printer in the speed control system using the frequency generator, the phase lag amount is preferably not more than 15 degrees.

Further, on the basis of the rotational speed N (r/min), and the number n of the power generation wire-elements, the frequency fg of the frequency generator can be represented by expression (2).

$$fg=\frac{N}{60}\cdot\frac{n}{2} \tag{2}$$

From the expression (2), expression (3) is derived.

$$n=\frac{120fg}{N} \tag{3}$$

Assuming that fc=15 Hz, fg=225 Hz, and if the rotational speed N is 300 r/min, the number n of the power generation wire-elements is found at 90 while if the rotational speed N is 500 r/min, the number n of the power generation wire-elements is found at 54.

As described above, due to constraints on the motor rotational speed, the number n of the power generation wire-elements, in a range of 54 to not less than 90, is required in order to ensure stability of the speed control system, and the more the number n is, the better.

Figure 5:
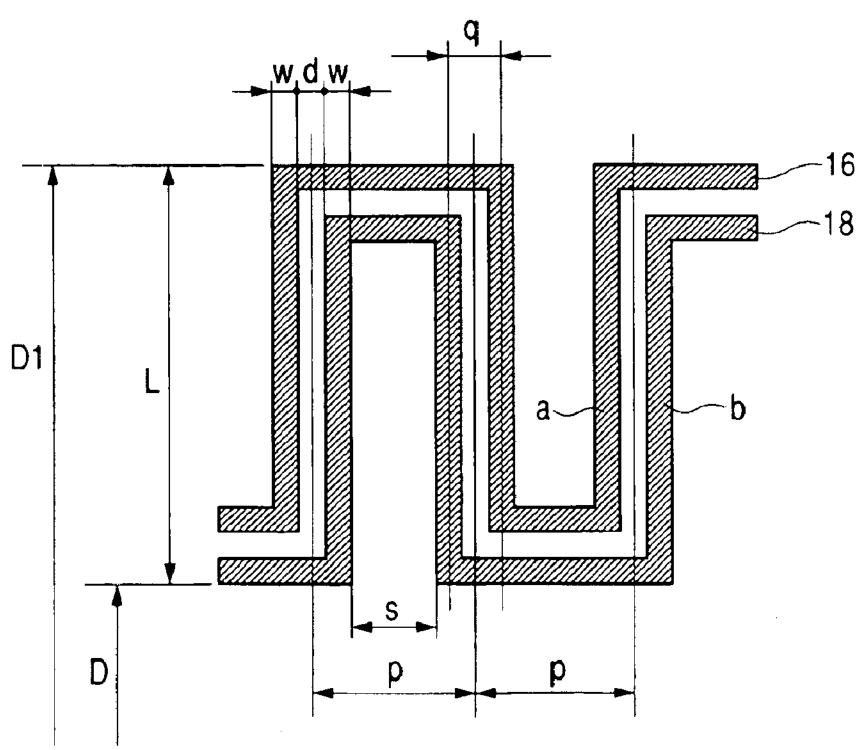
FIG. 5 is a schematic illustration showing in detail respective shapes of the coil patterns of the motor with the frequency generator attached thereto, shown in FIG. 1.
Figure 6:
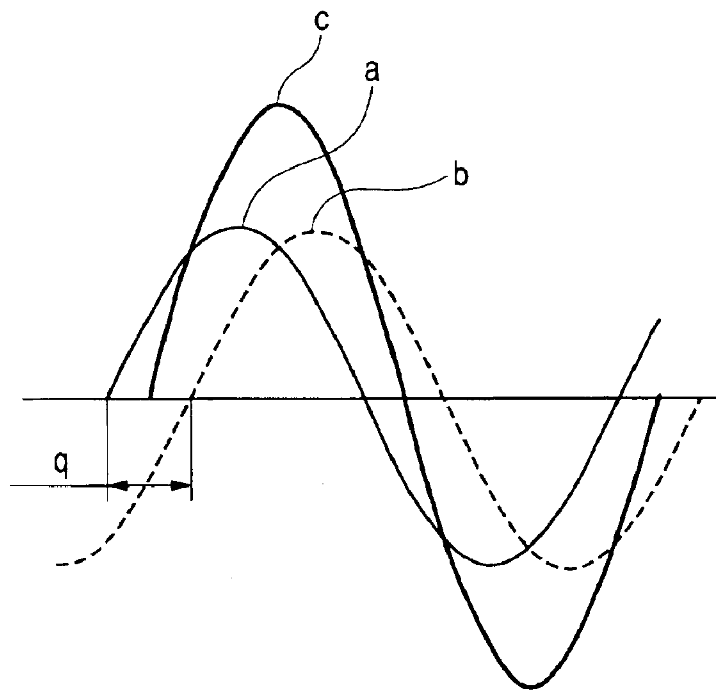
FIG. 6 is a graph showing a phase relation between respective voltages generated to power generation wire-elements of the coil patterns of the motor with the frequency generator attached thereto, shown in FIG. 1.

Further, as shown in FIG. 5, it is assumed that a half of a difference between the diameter D1 of the coil pattern 16 and an inside diameter D of the coil pattern 18, that is, a length of the power generation wire-element, in the direction of a motor diameter, is L, a width of the coil patterns 16, 18, respectively, is w, a pattern interval between the coil patterns 16, 18 is d, and a pitch of the frequency generator magnetic poles 22 is p. Still further, FIG. 6 shows a phase relation between a voltage generated to the power generation wire-element a, and a voltage generated to the power generation wire-element b, against change in magnetic fluxes of the magnet 8. In FIG. 6, a line "a" indicates an output voltage occurring to the power generation wire-element a, a line "b" indicates an output voltage occurring to the power generation wire-element b, and a line c indicates a composite value of the output voltage occurring to the power generation wire-element a and the output voltage occurring to the power generation wire-element b.

Assuming that a narrow pitch between the power generation wire-elements b themselves is "s" against the pitch p, a relationship therebetween can be represented by expression (4).

$$p=2\left(\frac{d}{2}+w\right)+s \tag{4}$$

Basically considered, if s=0, and a pitch of the power generation wire-elements a and a pitch of the power generation wire-elements b are equal to the pitch p of the magnetic poles, an amount of generated power becomes twice as much, however, because of existence of two coil patterns, namely, the coil patterns 16, 18, the pitch of the power generation wire-elements a and the pitch of the power generation wire-elements b does not coincide with each other. An amount q of such deviation can be represented by expression (5).

$$q=d+w \quad (5)$$

Further, in order to extract the output voltage e in a large amount, the discrepancy amount q is preferably in a range of 45 to 90° in terms of electrical angle. At q=p/4, the discrepancy amount q corresponds to 45°, and at q=p/2, the discrepancy amount q corresponds to 90°, so that the pitch p can be represented by expression (6).

$$\frac{p}{4} \le q \le \frac{p}{2} \quad (6)$$

Further, using the expression (5), the expression (6) can be represented as by expression (7).

$$\frac{p}{4} \le d + w \le \frac{p}{2} \quad (7)$$

Then, using the expression (4), expression (8) is given.

$$d \leqq s \leqq 3d+2w \quad (8)$$

Further, reverting to the expression relating to the pitch p by use of the expression (4), expression (9) is derived.

$$2\,(d+w) \leqq p \leqq 4(d+w) \quad (9)$$

In order to provide the coil patterns 16, 18 of the frequency generator on the printed wiring board 10 at a low cost, it is required that the minimum value of the width w of the coil patterns 16, 18, respectively, is not less than 0.25 mm, and the pattern interval d is not less than 0.25 mm if the process of manufacturing the coil patterns 16, 18 is taken into account. By substituting 0.25 for w, and 0.25 for d in the expression (9), expression (10) is derived, so that it is found that the pitch of the power generation wire-elements and the pitch p of the frequency generator magnetic poles 22, respectively, are adopted to fall in a range of 1 to 2 mm.

$$1 \leqq p \leqq 2 \quad (10)$$

Further, the pitch p can be represented by expression (11) to be thereby converted into expression (12) to find the number n of the power generation wire-elements.

$$p = \frac{(D-2L)\pi}{n} \quad (11)$$

$$n = \frac{(D-2L)\pi}{p} \quad (12)$$

Herein, if L=5 mm, and D=60 mm, by substituting 1 mm for p, the number n of the power generation wire-elements is found to be 157, and by substituting 2 mm for p, the number n of the power generation wire-elements is found to be 78. Similarly, if L=5 mm, and D=40 mm, the number n of the power generation wire-elements is found to be in a range of 94 to 47. That is, if the inside diameter D is in a size range of 40 to 60 mm, the number n of the power generation wire-elements, enabling effective power generation, is in a range of 47 to 157.

Further, it is evident that the number n of the power generation wire-elements, in the range of 54 to not less than 90, for ensuring stability of the speed control system, as found from the above-described three expressions, falls within the above-described range of 47 to 157, and can be implemented, so that, in practical applications, the number n of the power generation wire-elements is in the range of 54 to 157.

Thus, with the motor with the frequency generator attached thereto, according to the invention, since the main magnetic poles 20 and the frequency generator magnetic poles 22 are caused to contribute to the generated voltage of the frequency generator, the output voltage of the frequency generator can be extracted in a large amount. In addition, the output voltage of the frequency generator does not contain disturbance caused by main magnetic pole components of the output voltage, thereby enabling the motor to suppress variation in rotational speed. Further, since the main magnetic poles 20 and the frequency generator magnetic poles 22 are made up of one piece of the magnet 8, the motor can be made at a low cost. Further, it is possible to decide on power generation wire-elements that are most suitable for a shape of the motor.

Figure 7:
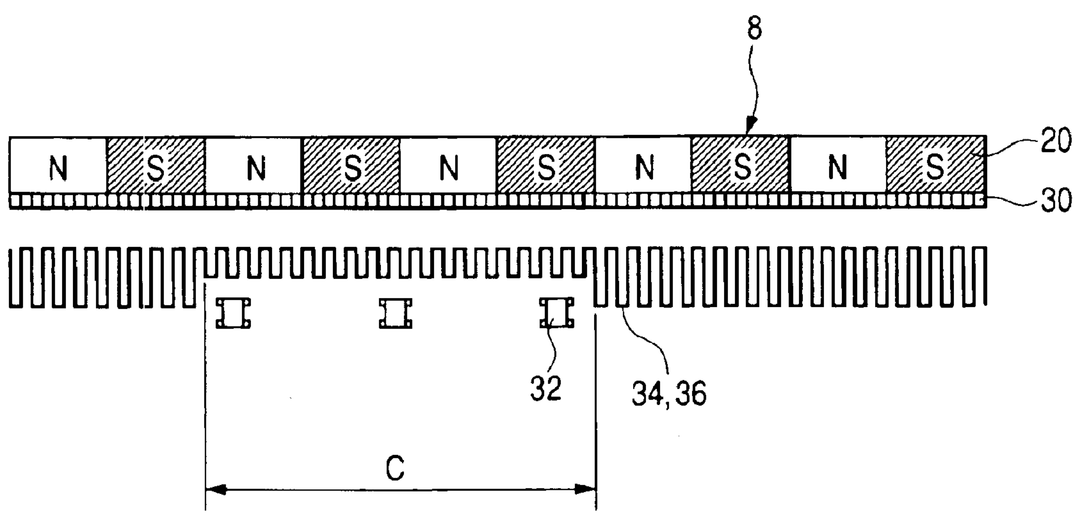
FIG. 7 is a schematic illustration showing a relationship among main magnetic poles, frequency generator magnetic poles, and coil patterns for frequency power generation with reference to another motor with a frequency generator attached thereto, according to the invention.

Now, with another motor with a frequency generator attached thereto, according to the invention, a relationship among main magnetic poles, frequency generator magnetic poles, and coil patterns for power generation is described hereinafter with reference to FIG. 7. In the case where electronic components 32 are provided in respective parts of coil patterns 34, 36 (indicated by the same line), on top of a printed wiring board 10, a generated voltage drops in the parts where respective power generation wire-elements of the coil patterns 34, 36 are shorter in length. If the number of magnetic poles of frequency generator magnetic poles 30 as well as the number of the respective power generation wire-elements of the coil patterns 34, 36 is 90, the frequency generator magnetic poles 30 are disposed at the same pitches as those for the respective power generation wire-elements of the coil patterns 34, 36, and in the same number as that for the latter, so that a generated voltage e1 caused by the frequency generator magnetic poles 30 is constant, however, because the number of magnetic poles of main magnetic poles 20 is fewer, power generation occurs only to the power generation wire-elements disposed at the same pitches as those for the main magnetic poles 20, resulting in occurrence of a phenomenon where a total amount of respective generated voltages of the power generation wire-elements that generate power varies in magnitude by locations if there exist the power generation wire-elements that are shorter in length. Accordingly, ripples, large and small, occur to a generated voltage e2 caused by the main magnetic poles 20. In order to cope with the phenomenon, 36 of the respective power generation wire-elements of the coil patterns 34, 36, within a width C, corresponding to four magnetic poles (corresponding to an even number of the magnetic poles) of the main magnetic poles 20, are rendered shorter in length in the direction of a motor diameter. As a result, ripple components does not occur to the generated voltage e2 although an output voltage drops. Accordingly, even if the power generation wire-elements are partially broken off or shortened, no disturbance component occurs to an output of the frequency generator.

Further, with still another motor with a frequency generator attached thereto, according to the invention, a relationship among main magnetic poles, frequency generator magnetic poles, and coil patterns for power generation is described hereinafter with reference to FIG. 8. A magnetic pole of frequency generator magnetic poles 40 located at one end of one magnetic pole of main magnetic poles 20 of a magnet 8 differs in polarity from another magnetic pole of the frequency generator magnetic poles 40 located at the other end of the one magnetic pole of the main magnetic poles 20, the main magnetic poles 20 are aligned with the frequency generator magnetic poles 40, respectively, and respective power generation wire-elements of first and second coil patterns 42, 44 are disposed so as to correspond to the frequency generator magnetic poles 40, respectively. More specifically, the number of the magnetic poles of the frequency generator magnetic poles 40 is even multiples of the number of the magnetic poles of the main magnetic poles 20, that is, 100 poles while the number of the respective power generation wire-elements of the coil patterns 42, 44 is equal to the number of the magnetic poles of the frequency generator magnetic poles 40, that is, 100.

In this case, since 50 represents a half of the least common multiple of the number of the magnetic poles of the main magnetic poles 20, that is, 10, and the number of lengths of the power generation wire-elements, that is, 100, it is calculated that an output voltage e2 of 50 cycles is generated for every one revolution of a motor, however, in the case of an even number of the power generation wire-elements lie within a range of one magnetic pole of the main magnetic poles, no power is generated by the main magnetic poles 20. In FIG. 8, portions of respective voltages occurring to the coil patterns 42, 44, caused by the respective main magnetic poles 20, are indicated by a larger arrow, and the power generation wire-elements are connected together in directions such that respective directions of power generation occurring to the respective portions negate each other to thereby cancel out power generation, thus resulting in e2=0. Further, the frequency generator magnetic poles 40 generate an output voltage e1 of 50 cycles corresponding to a half of the least common multiple of the number of the magnetic poles of the frequency generator magnetic poles 40, that is, 100, and the number of the lengths of the power generation wire-elements, that is, 100, and the output voltage e1 can be represented by expression (13) as follows:

$$e1=v1\cdot\sin(50\theta) \quad (13)$$

Accordingly, an output voltage e of the frequency generator can be represented by expression (14) as follows, showing that it is not subject to the effect of the main magnetic poles 20.

$$e=e1=v1\cdot\sin(50\theta) \quad (14)$$

Figure 8:
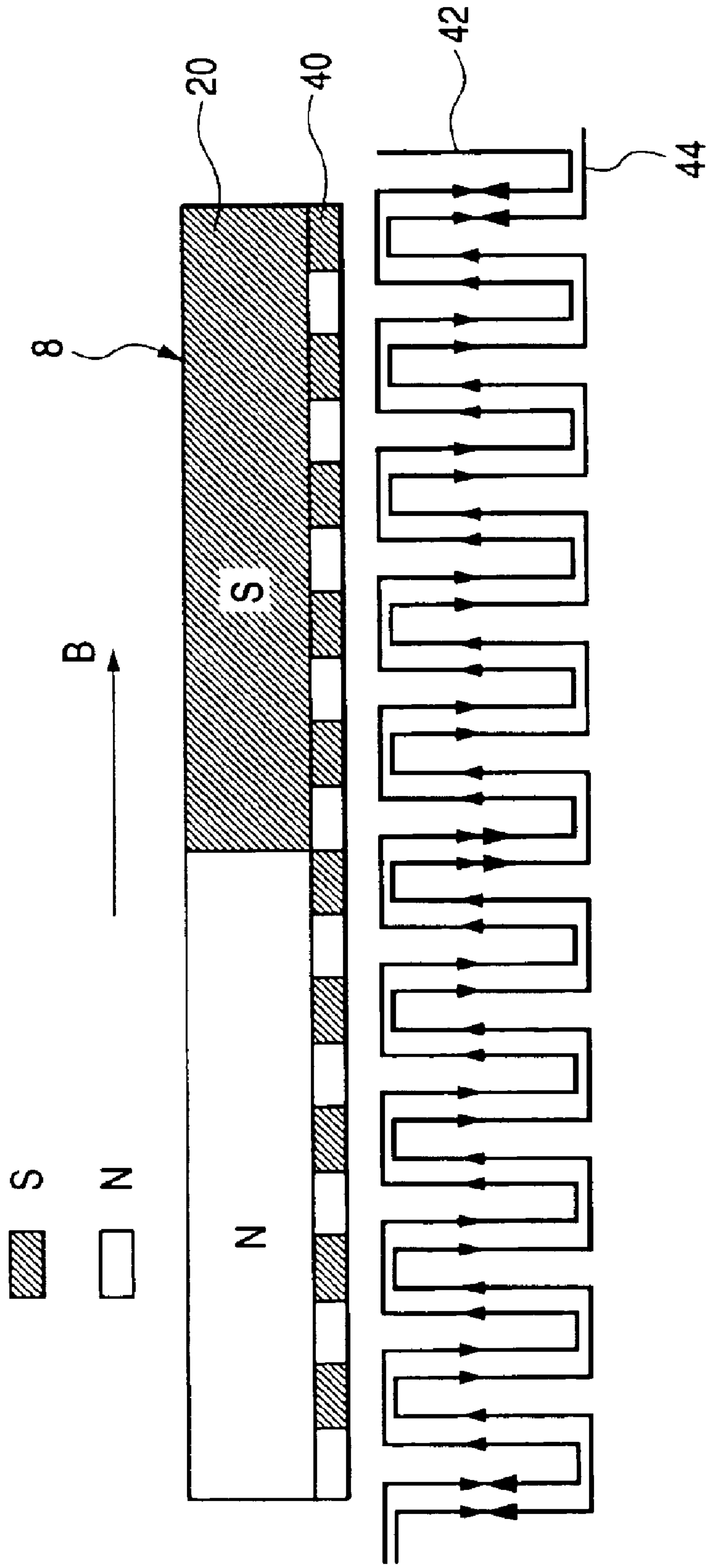
FIG. 8 is a schematic illustration showing a relationship among main magnetic poles, frequency generator magnetic poles, and coil patterns for frequency power generation with reference to still another motor with a frequency generator attached thereto, according to the invention.

In the case shown in FIG. 8 as well, if the coil patterns 42, 44 each have the power generation wire-elements locally short in length in the direction of a motor diameter, occurrence of ripple components to the generated voltage e2 can be prevented by rendering portions of the respective power generation wire-elements of the coil patterns 42, 44, within a width corresponding to an even number of the magnetic poles of the main magnetic poles 20, shorter in length in the direction of the motor diameter.

Further, with the above-described embodiments, examples are disclosed wherein the power generation wire-elements are locally rendered shorter, however, it is evident that locally eliminating the same will have an effect equivalent thereto.

By mounting the above-described motor with the frequency generator attached thereto in OA equipment, for use as a motor for driving drums thereof, output images can be improved and miniaturization of the OA equipment can be implemented.

What is claimed is:

1. A motor with a frequency generator attached thereto, said motor comprising:

a magnet in a ring-like shape, having 10 poles of main magnetic poles for driving the motor provided at equal pitches and magnetized in the radial direction, and a plurality of frequency generator magnetic poles provided at equal pitches on an end face of the magnet and magnetized in the direction of a motor axle, said magnet rotating integrally with the motor axle;

a stator yoke having 12 salient poles as main magnetic poles, disposed opposite to the inner circumference of the magnet with a gap interposed therebetween; and a printed wiring board disposed so as to oppose the end face of the magnet with a gap interposed therebetween, wherein a first coil pattern and a second coil pattern, in rectangular waveform, having a plurality of power generation wire-elements radially formed, respectively, are disposed on a surface of the printed wiring board, opposite to the end face of the magnet, the first coil pattern and the second coil pattern being connected with each other in series; a motor rotational speed is in a range of 300 to 500 revolutions/minute; an inside diameter of the magnet having a range of 40 to 65 mm, the number of magnetic poles of the frequency generator magnetic poles is in a range of 54 to 157, corresponding to odd multiples of the number of the magnetic poles of the main magnetic poles, and the number of the power generation wire-elements of the first coil pattern and the second coil pattern, respectively, is equal to the number of the magnetic poles of the frequency generator magnetic poles, the magnetic poles of the frequency generator magnetic poles, located at both ends of one magnetic pole of the main magnetic poles, respectively, have the same polarity as that of said one magnetic pole of the main magnetic poles, and the main magnetic poles are aligned with the frequency generator magnetic poles, respectively.

2. The motor with a frequency generator attached thereto, according to claim 1, wherein the respective power generation wire-elements of the first and second coil patterns, within a width corresponding to an even number of the magnetic poles of the main magnetic poles, are rendered shorter in length in the direction of a motor diameter.

3. A motor with a frequency generator attached thereto, said motor comprising:

a magnet in a ring-like shape, having 10 poles of main magnetic poles for driving the motor provided at equal pitches and magnetized in the radial direction, and a plurality of frequency generator magnetic poles provided at equal pitches on an end face of the magnet and magnetized in the direction of a motor axle, said magnet rotating integrally with the motor axle;

a stator yoke having 12 salient poles as main magnetic poles, disposed opposite to the inner circumference of the magnet with a gap interposed therebetween; and a printed wiring board disposed so as to oppose the end face of the magnet with a gap interposed therebetween, wherein a first coil pattern and a second coil pattern, in rectangular waveform, having a plurality of power generation wire-elements radially formed, respectively, are disposed on a surface of the printed wiring board, opposite to the end face of the magnet, the first coil pattern and the second coil pattern being connected with each other in series, a motor rotational speed is in a range of 300 to 500 revolutions/minute; an inside diameter of the magnet having a range of 40 to 65 mm, the number of magnetic poles of the frequency generator magnetic poles is in a range of 54 to 157, corresponding to even multiples of the number of the magnetic poles of the main magnetic poles, and the number of the power generation wire-elements of the first coil pattern and the second coil pattern, respectively, is equal to the number of the magnetic poles of the frequency generator magnetic poles, and the main magnetic poles are aligned with the frequency generator magnetic poles, respectively.

4. The motor with a frequency generator attached thereto, according to claim 3, wherein the respective power generation wire-elements of the first and second coil patterns, within a width corresponding to an even number of the magnetic poles of the main magnetic poles, are rendered shorter in length in the direction of a motor diameter.

5. Office automation equipment wherein a motor with a frequency generator attached thereto, according to claim 1, is mounted for use as a motor for driving drums.

6. Office automation equipment wherein a motor with a frequency generator attached thereto, according to claim 2, is mounted for use as a motor for driving drums.

7. Office automation equipment wherein a motor with a frequency generator attached thereto, according to claim 3, is mounted for use as a motor for driving drums.

8. Office automation equipment wherein a motor with a frequency generator attached thereto, according to claim 4, is mounted for use as a motor for driving drums.

* * * * *